US012686161B2

(12) United States Patent
Garralda Arizcuren et al.

(10) Patent No.: US 12,686,161 B2
(45) Date of Patent: Jul. 21, 2026

(54) DEVICE FOR MOULDING PLASTIC PARTS

(71) Applicants: María Victoria Garralda Arizcuren, Gorraiz (ES); Antonio Nuñez Centaño, Gorraiz (ES)

(72) Inventors: María Victoria Garralda Arizcuren, Gorraiz (ES); Antonio Nuñez Centaño, Gorraiz (ES); Cristina Diaz Jimenez, Gorraiz (ES)

(73) Assignees: Maria Victoria Garralda Arizcuren, Gorraiz (ES); Antonio Nuñez Centaño, Gorraiz (ES)

( * ) Notice: Subject to any disclaimer, the term of this patent is extended or adjusted under 35 U.S.C. 154(b) by 240 days.

(21) Appl. No.: 18/292,044

(22) PCT Filed: Jul. 27, 2021

(86) PCT No.: PCT/ES2021/070565
§ 371 (c)(1),
(2) Date: Jan. 25, 2024

(87) PCT Pub. No.: WO2023/007035
PCT Pub. Date: Feb. 2, 2023

(65) Prior Publication Data
US 2024/0335999 A1 Oct. 10, 2024

(51) Int. Cl.
*B29C 51/42* (2006.01)
*B29C 51/36* (2006.01)

(52) U.S. Cl.
CPC ............ *B29C 51/428* (2013.01); *B29C 51/36* (2013.01)

(58) Field of Classification Search
CPC ..... B29C 51/427; B29C 51/428; B29C 51/36; B29C 51/082; B29C 51/10; B29C 33/02; B29C 33/04
See application file for complete search history.

(56) References Cited

U.S. PATENT DOCUMENTS

| | | | |
|---|---|---|---|
| 2,452,999 A | 11/1948 | Daly et al. | |
| 5,105,430 A * | 4/1992 | Mundinger | H01S 5/0233 |
| | | | 372/50.1 |
| 2022/0097289 A1* | 3/2022 | Aufenast | B29C 51/30 |

FOREIGN PATENT DOCUMENTS

| | | | |
|---|---|---|---|
| CN | 109955464 A | | 7/2019 |
| JP | S62146616 A | * | 6/1987 |

(Continued)

OTHER PUBLICATIONS

JP3191217U_Machine Translation (Year: 2014).*

(Continued)

*Primary Examiner* — Yunju Kim

(74) *Attorney, Agent, or Firm* — LUCAS & MERCANTI, LLP

(57) ABSTRACT

A device for moulding plastic parts, which comprises a first element (100) with at least one cavity (101) configured to receive and shape a portion of plastic material, and at least one second element (200) configured to cover the at least one cavity (101) of the first element (100), wherein the device is configured to shape the portion of plastic material by suction and/or blowing of a gaseous fluid, wherein the first element (100) comprises: a coolant inlet (108); at least one coolant pipe (107) connected to the coolant inlet (108) with a plurality of spray orifices (110) configured to spray the coolant fluid against the bottom face of the at least one cavity (101); and at least one drain (109) configured to allow the discharge of the coolant coming from the at least one coolant pipe (107).

11 Claims, 9 Drawing Sheets

(56) References Cited

FOREIGN PATENT DOCUMENTS

| JP | 3191217 | U | * | 6/2014 |
| WO | 2020127807 | A1 | | 6/2020 |

OTHER PUBLICATIONS

JP S62146616A_Machine Translation (Year: 1987).*
International Search Report for Corresponding International Application No. PCT/ES2021/070565 dated Oct. 25, 2021 and English translation; 5 pages.

* cited by examiner

DEVICE FOR MOULDING PLASTIC PARTS

CROSS-REFERENCE TO RELATED APPLICATION

This application is a 371 of PCT/ES2021/070565, filed Jul. 27, 2021, which is incorporated herein by reference.

TECHNICAL FIELD

The subject matter of the present invention is a device for moulding plastic parts that reduces the manufacturing costs of plastic parts manufactured by thermoforming moulding.

The device for moulding plastic parts subject matter of the present invention also increases the efficiency in the cooling of the plastic parts inside the moulds and, therefore, achieves higher production speeds.

The device for moulding plastic parts subject matter of the present invention is applicable in the industry dedicated to the manufacture of plastic parts by thermoforming, as well as in the industry dedicated to the manufacture of moulds for the production of said plastic parts by thermoforming.

STATE OF THE ART

In the state of the art, in the manufacture of plastic containers, moulds are generally used to shape a plastic sheet, which is deformed reproducing the shape of the mould and maintaining extreme thinness.

In this way, fruit boxes, yogurt containers, bottles, etc. can be manufactured.

To manufacture these plastic containers using a mould, there must be an air blowing/absorption system that forces the sheet to take the shape of the cavity, the sheet being trapped between a mould (female element or cavity) and a countermould (male element).

As has been said, the mould must have an air absorption system that allows the plastic sheet to be pulled against the walls and bottom of the mould. The manufacture of this type of mould usually starts from a block, usually made of aluminium, which is machined by removing material to obtain the shape of the mould. These machining tasks for the manufacture of each mould for each plastic container represent a high cost that increases the overall cost of manufacturing plastic containers.

Furthermore, in all moulding processes it is essential to maintain an adequate temperature to allow the plastic sheet to adapt to the mould, and rapid cooling to allow the mould to be removed without the moulded plastic part sticking, thus allowing the plastic part to maintain its shape after demoulding. This cooling is usually carried out externally to the mould, for example, by means of a coil arranged in the moulding machine, which makes the moulding process more expensive and complicated, and provides a cooling speed lower than is desirable if large batches of parts are to be mass manufactured.

OBJECT OF THE INVENTION

In order to solve the aforementioned drawbacks, the present invention relates to a device for moulding plastic parts.

The device for moulding plastic parts subject matter of the present invention comprises a first element (female element or mould) with at least one cavity configured to receive and shape a portion or sheet of plastic material.

The device for moulding plastic parts subject matter of the present invention also comprises at least one second element (male element or countermould) configured to cover the at least one cavity of the first element and assist in the shaping of the portion or sheet of material plastic.

The device is configured to shape the portion or sheet of plastic material by suction and/or blowing a gaseous fluid (for example, pressurised air).

In a novel way, in the device for moulding plastic parts subject matter of the present invention, the first element comprises:

a coolant inlet configured for connection of an external coolant pumping system;

at least one coolant pipe, formed in the first element, connected to the coolant inlet, wherein the at least one coolant pipe is configured to allow the flow of coolant along said at least one coolant pipe, a plurality of spray orifices configured to allow the outlet of the coolant from the at least one coolant pipe and its spraying against a lower face of the at least one cavity and;

at least one drain configured to allow the discharge of the coolant from the at least one coolant pipe.

By means of the device for moulding plastic parts described above, it is possible to dispense with a coil cooling system in the moulding machine, as occurs in the moulding machines of the state of the art.

Likewise, allows an external shower system of the moulds to be dispensed with, which system sprays said moulds on the outside for cooling, since in the device for moulding plastic parts subject matter of the present invention, the cooling of the first element of the device is carried out inside said first element.

Likewise, the cooling efficiency is considerably increased with respect to the systems for moulding plastic parts of the state of the art, since, in the device of the invention, as the coolant flows through the inside of the first element of the mould, the coolant flows much closer to the cavities of the mould than in mould cooling systems of the state of the art.

By means of this preferred embodiment of the device of the invention, all the cavities for moulding the plastic parts can be sprayed on the lower face thereof, establishing, through a lower showering, a much closer contact of the coolant with the cavities to be cooled, greatly increasing the cooling efficiency through the transmission of heat by convection towards the coolant that is effectively and homogeneously sprayed over the lower portion of the cavities.

According to a preferred embodiment of the invention, the first element comprises at least one cooling gallery configured to collect the coolant sprayed from the spray orifices and direct the cooling liquid to the at least one drain.

This configuration allows an orderly discharge of the coolant through the at least one drain, enabling all of the coolant evacuated through the drain to be collected for subsequent recycling or reuse.

Preferably, each coolant pipe comprises a narrowing configured to produce an acceleration of the coolant by the Venturi effect and a homogeneous outlet of the coolant through the spray orifices.

According to a preferred embodiment of the invention, the first element of the device comprises:

a first base which in turn comprises the at least one cavity;

a second base located on the opposite side to the at least one cavity of the first base, and;

an intermediate panel, arranged between the first base and the second base.

The intermediate panel comprises the coolant inlet, the at least one drain, the at least one coolant pipe and the at least one cooling gallery.

By means of this three-piece configuration of the first element of the device, the manufacturing thereof is facilitated, especially in the preferred embodiments in which each cooling pipe comprises the aforementioned spray orifices for spraying coolant against the lower portion of the cavities, and especially when there is a plurality of cooling pipes that are interconnected by means of sleeves or hoses.

According to a preferred embodiment of the device for thermoforming plastic parts subject matter of the present invention, the first element comprises a suction nozzle. The at least one cavity comprises a plurality of suction orifices connected to the suction nozzle. The suction nozzle is configured for the connection of an external suction system.

This feature allows each cavity to be interconnected with the external suction system, such that by means of said external suction system it is possible to establish a suction force on the sheet or portion of plastic material in each cavity.

Preferably, the suction orifices of the at least one cavity pass through the first base and are connected to the suction nozzle through suction ducts arranged in the intermediate panel. Each suction duct connects a suction orifice with a suction chamber existing in a space between the intermediate panel and the second base. The suction nozzle is arranged on the second base and is configured to connect the suction chamber with the external suction system.

In this way, continuity is provided to the suction circuit when the first element is configured in three pieces.

Preferably, the first base comprises three first threaded holes located in correspondence with three second threaded holes of the intermediate panel, such that the first base is configured to be integrally joined to the intermediate panel by introducing screws into the first threaded holes and in the second threaded holes.

In this way, a solid join is achieved between the first base and the intermediate panel, thus enclosing the cooling circuit therebetween.

Preferably, the first threaded holes and the second threaded holes are respectively arranged centrally in the first base and in the intermediate panel.

According to a preferred embodiment of the device, the first base comprises a plurality of third threaded holes located in correspondence with through orifices of the intermediate panel and with fourth threaded holes of the second base, such that the first base is configured to be integrally joined to the second base, through the intermediate panel, by inserting screws in the third threaded holes, in the through orifices and in the fourth threaded holes.

In this way, it is possible to firmly join the three pieces of the first element of the device.

Preferably, the third threaded holes, the through orifices and the fourth threaded holes are homogeneously distributed respectively along the perimeters of the first base, the intermediate panel and the second base.

According to a possible embodiment of the device of the invention, the first base is a hollow part. This makes it possible to reduce the weight of the first element of the device, reduce its cost and, above all, increase cooling efficiency, since there is less thermal resistance to the passage of heat from the plastic, through the first base, to the coolant.

According to a possible embodiment of the device for moulding plastic parts subject matter of the present invention, the at least one through cavity has a geometry configured to receive a mould element, wherein the mould element has a specific geometry according to the plastic part to be manufactured.

In this way, it is possible to have cavities with a generic geometry to which the mould element adapts, in such a way that the first element of the device can be valid for the manufacture of plastic parts with different geometries. It is only necessary for the cavity to allow the housing of the mould element, which does comprise a hole or cavity with a specific geometry depending on the part to be manufactured. This allows the mould element to be made with a more resistant material, which can be manufactured, for example, by machining or 3D printing, while the rest of the elements of the thermoforming device can be manufactured by 3D printing.

Preferably, each mould element comprises a plurality of perimeter orifices arranged in correspondence with threaded orifices of the at least one cavity, such that each mould element is configured to be integrally joined to the at least one cavity, by inserting screws in the perimeter orifices and in the threaded orifices.

Preferably, in the device for moulding plastic parts subject matter of the present invention, the at least one second element comprises a plurality of passages of gaseous fluid (for example, pressurised air) configured to allow a passage of pressurised gaseous fluid from an external gaseous fluid blowing system through said gaseous fluid passages.

According to a possible embodiment of the device of the invention, each second element comprises fastening means for fastening to a plate, such that, by moving the plate and its positioning on the first element, it is possible to position each second element in correspondence with each cavity of the first element. The plate comprises a plurality of blowing orifices configured to allow the passage of gaseous fluid from the external gaseous fluid blowing system towards each second element and towards each cavity.

Preferably, the first element (one, two or three pieces) and/or the second element are manufactured by 3D printing.

This feature allows great versatility in the final product, adapting it to the manufacturing needs. Likewise, much lighter devices for moulding are achieved, which until the arrival of 3D technology would have been impossible to create.

In this case, the blowing/absorption of air is carried out through the mould, meaning the use of 3D printing moulds that allow the shapes thereof to be adapted to accommodate the air blowing circuits is especially appropriate. In addition, the manufacture of the cooling circuit inside the device is facilitated by means of 3D printing technology.

The device is thus provided with an internal, not external, water (or other coolant) cooling system (and, therefore, far from the point of application), but internal to the device for moulding, with direct contact of the water with the interior part of the mould using a shower system that allows immediate replacement of water after use and direct contact with the surface of interest.

DESCRIPTION OF THE FIGURES

The following figures have been included as part of the explanation of at least one embodiment of the invention.

DETAILED DESCRIPTION OF THE INVENTION

The present invention relates, as mentioned above, to a device for moulding plastic parts.

Figure 16:
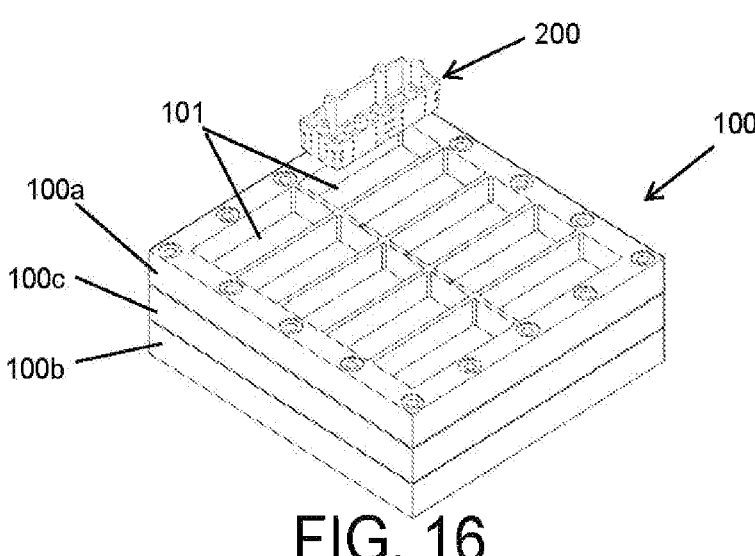
FIG. 16 shows an exploded perspective view of a first element and a second element, according to a possible embodiment of the device for moulding plastic parts subject matter of the present invention, where the first element appears with the first base, the intermediate panel and the second base assembled.

As shown in FIG. 16, the device for moulding plastic parts comprises a first element (100) or female element (mould) and at least a second element (200) or male element ("countermould").

The first element (100) in turn comprises a first base (100*a*), an intermediate panel (100*c*) and a second base (100*b*).

Figure 1:
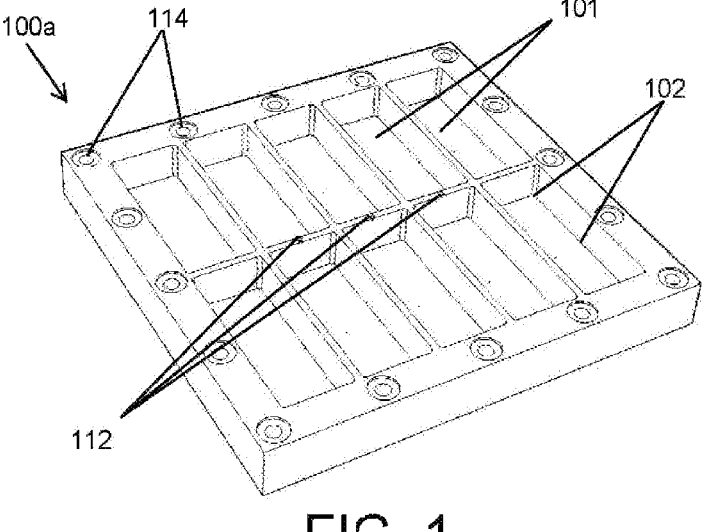
FIG. 1 shows a schematic perspective view of a possible embodiment of the first base of the first element of the device for moulding plastic parts subject matter of the present invention, where the cavities for moulding different plastic parts can be seen.

As shown in FIG. 1, the first base (100*a*) comprises one or more cavities (101) configured to receive the plastic material, providing it with the shape of said cavity or cavities (101).

Figure 3:
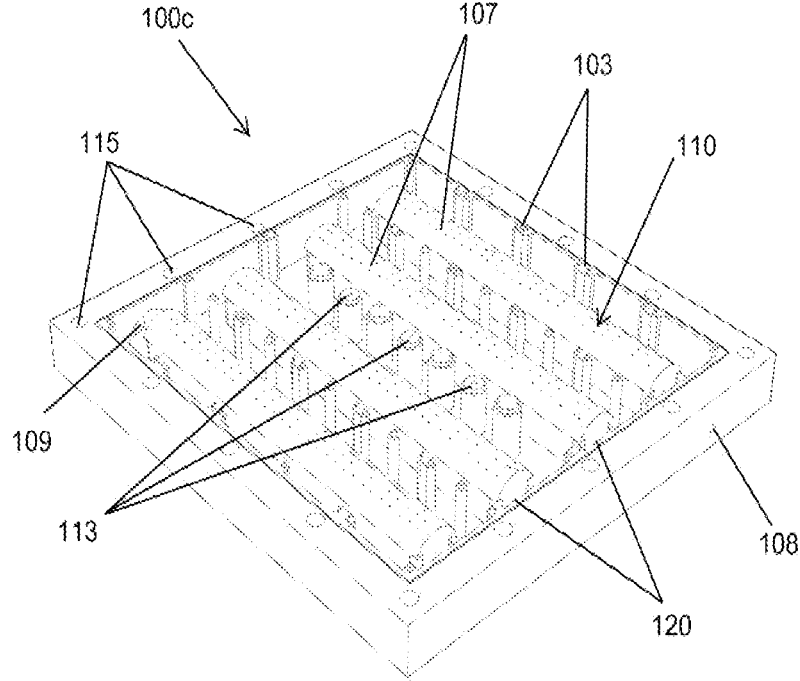
FIG. 3 shows a schematic perspective view of a possible embodiment of the intermediate panel of the first element of the device for moulding plastic parts subject matter of the present invention, where the upper surface of the intermediate panel is seen, configured to face the first base of the first element of the device.
Figure 7:
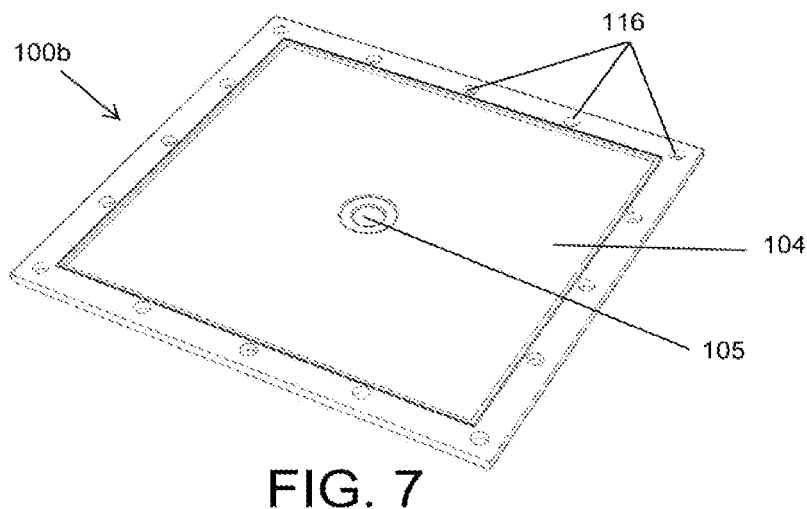
FIG. 7 shows a schematic perspective view of a possible embodiment of the second base of the first element of the device for moulding plastic parts subject matter of the present invention, where the upper surface of the second base is seen, configured to face the intermediate panel of the first element of the device.

The first base (100*a*) further comprises a plurality of suction orifices (102) that connect each cavity (101) of the first base (100*a*) with a network of air suction ducts (103) of the intermediate panel (100*c*) (see FIG. 3). These air suction ducts (103) of the intermediate panel (100*c*) are in turn connected to a suction chamber (104) (see FIG. 7) located in the hollow space existing between the intermediate panel (100*c*) and the second base (100*b*). This suction chamber (104) is connected to an air suction nozzle (105) located on the second base (100*b*), configured for the connection of an external suction system (not shown). The suction orifices (102) allow the inlet of air towards the suction ducts (103), when the external suction system is activated and connected to the second base (100*b*), therefore these suction orifices (102) perform the suction function to mould the plastic sheet with the shape of the cavity or cavities (101) of the first base (100*a*), by pulling the sheet against the bottom of said cavity or cavities (101) of the first base (100*a*).

Figure 5:
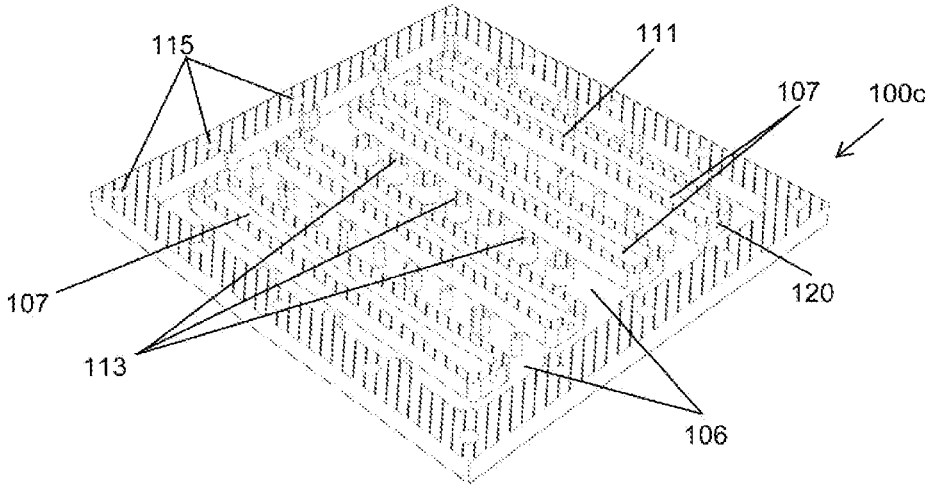
FIG. 5 shows a schematic perspective view, with a cross section according to a plane parallel to its largest surfaces, of the intermediate panel of FIG. 3.
Figure 6:
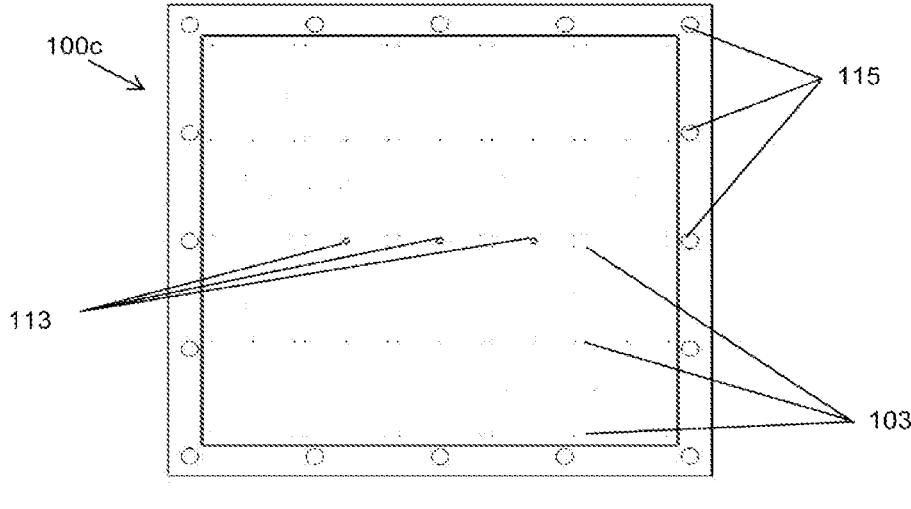
FIG. 6 shows a schematic perspective view of the intermediate panel of FIG. 3, where the lower surface of the intermediate panel is seen, configured to face the second base of the first element of the device for moulding plastic parts subject matter of the present invention.

The intermediate panel (100*c*) comprises a plurality of cooling galleries (106). In the cooling galleries (106), preferably there are hoses or sleeves (not shown) that connect coolant pipes (107) to each other, and a hose or sleeve that connects at least one of the coolant pipes (107) to a coolant inlet (108) (water or other coolant) through connection nozzles (120) (see FIGS. 3, 5 and 10). The coolant inlet (108) is configured for the connection of an external coolant pumping system (not shown).

Figure 4:
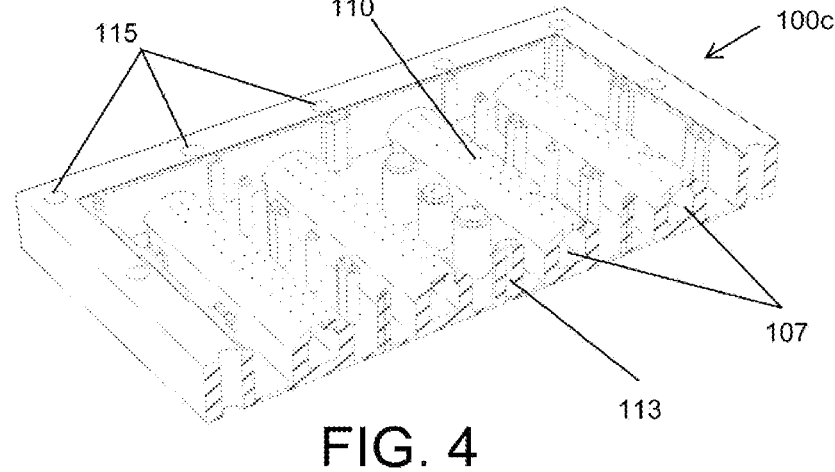
FIG. 4 shows a cross-sectional schematic perspective view of the intermediate panel of FIG. 3.

Each coolant pipe (107) is equipped with a plurality of spray orifices (110) (see FIG. 3 and FIG. 4) oriented towards the first base (100*a*) of the first element (100) of the device for moulding plastic parts, configured to let the coolant escape in order to spray a surface of the first base (100*a*), opposite to the cavities (101), thus cooling the first base (100*a*) of the first element (100) of the device for moulding plastic parts.

Figures 10, 11:
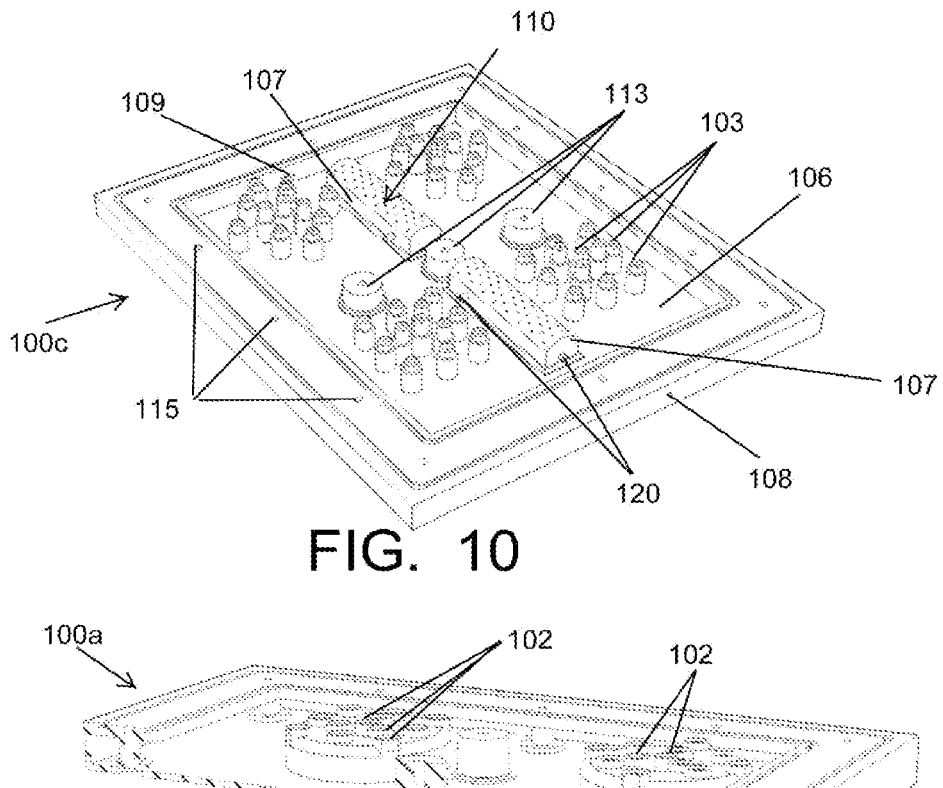
FIG. 10 shows a schematic perspective view of an embodiment, which is an alternative to the embodiment of FIG. 3, of the intermediate panel of the first element of the device for moulding plastic parts subject matter of the present invention, where this alternative embodiment of the intermediate panel corresponds to the embodiment of the first base of the first element of the device shown in FIG. 9.
FIG. 11 shows a cross-sectional schematic perspective view of the first base of the first element of the device according to the embodiment of the first base shown in FIG. 9, where this first base is hollow.

After having sprayed the surface of the first base (100*a*) opposite the cavities (101), the coolant is collected and guided through the cooling galleries (106) of the intermediate panel (100*c*), towards one or more drains (109), for the discharge of the coolant (see FIG. 10).

The coolant pipes (107) preferably comprise a narrowing (111) (see FIG. 5), configured to produce an acceleration, by the Venturi effect, of the flow of coolant, in order to adjust the pressure of the coolant and guarantee a homogeneous outlet of the coolant through the spray orifices (110), along the entire length of each coolant pipe (107).

Figure 2:
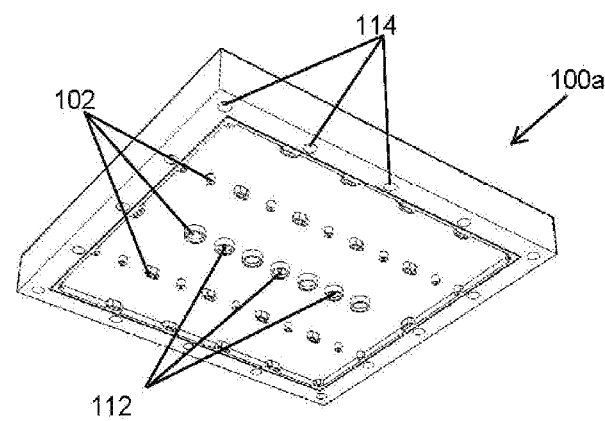
FIG. 2 shows a schematic perspective view of a possible embodiment of the lower surface opposite the cavities of the first base of the first element of the device for moulding plastic parts subject matter of the present invention.

The first base (100*a*) comprises three first threaded through holes (112) (see FIG. 1 and FIG. 2), located in correspondence with three second threaded holes (113) of the intermediate panel (100*c*) (see FIG. 3, FIG. 4, FIG. 5 and FIG. 6). In this way, it is possible to fasten the first base (100*a*) to the intermediate panel (100*c*) using screws, the two forming a solid assembly. Preferably, a sealing gasket (not shown) is used in the fastening between the surface of the first base (100*a*) opposite the cavities (101) and the surface of the intermediate panel (100*c*) facing the surface of the first base (100*a*) opposite the cavities. This prevents the leakage of coolant out of the device. Likewise, as seen in the Figures, the second holes (113) are preferably arranged housed along columns of the intermediate panel (100*c*) that are oversized in their cross section such that, in addition to serving to house the corresponding screw, they serve as structural reinforcement and prevent the first base (100*a*) from buckling or bending inward upon receiving the countermould or any other stress.

Both the first threaded through holes (112) of the first base (100*a*) and the corresponding second threaded holes (113) of the intermediate panel (100*c*) are preferably arranged centrally in the first base (100*a*) and in the intermediate panel (100*c*).

Figure 8:
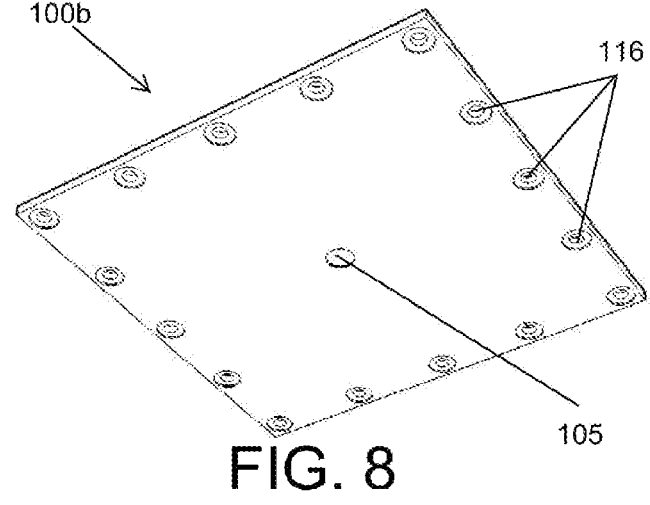
FIG. 8 shows a schematic perspective view of the second base of FIG. 7, where the lower surface of the second base is seen.

The first base (100*a*) also comprises a plurality of third threaded through holes (114), preferably distributed homogeneously along the perimeter of the first base (100*a*). These third threaded through holes (114) are located in correspondence with respective through orifices (115) distributed along the perimeter of the intermediate panel (100*c*). Likewise, the third threaded through holes (114) of the first base (100*a*) and the through orifices (115) of the intermediate panel (100*c*) are in turn located in correspondence with fourth threaded holes (116) distributed along of the perimeter of the second base (100*b*) (see FIG. 7 and FIG. 8). In this way, it is possible to fasten the assembly of the first base (100*a*) and the intermediate panel (100*c*) to the second base (100*b*) using screws. Preferably, a sealing gasket (not shown) is used in the fastening between both facing surfaces of the intermediate panel (100*c*) and the second base (100*b*). In this way, the inlet of suction air into the join between the intermediate panel (100*c*) and the second base (100*b*) is prevented.

Preferably, the first base (100*a*), the intermediate panel (100*c*) and the second base (100*b*) of the first element (100) of the device for moulding plastic parts, as well as the second element (200) of the device for moulding plastic parts, are manufactured using 3D printing.

Figure 9:
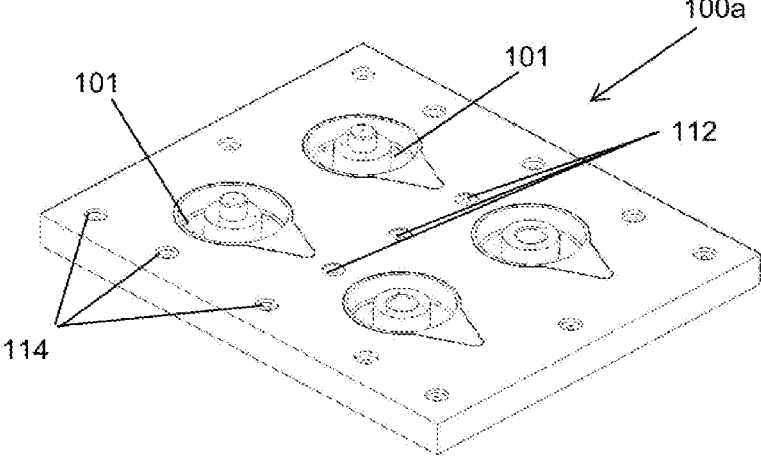
FIG. 9 shows a schematic perspective view of an embodiment, alternative to the embodiment of FIG. 1, of the first base of the first element of the device for moulding plastic parts subject matter of the present invention, where alternative shaped for the cavities for moulding different plastic parts can be seen.

The cavities (101) of the first base (100*a*) can have different geometries, depending on the geometry of the plastic part to be moulded. FIG. 9 shows an embodiment of the first base (100*a*), which is an alternative to the embodiment shown in FIG. 1, wherein the cavities (101) have a specific geometry of revolution with an intermediate protuberance configured to produce a container. FIG. 10 shows a specific configuration of the intermediate panel (100*c*), specially designed according to the first base of FIG. 9.

FIG. 1 and FIG. 9 show embodiments wherein the first base (100*a*) is solid.

However, according to a possible embodiment, the first base (100*a*) of the first element (100) of the device for moulding plastic parts is a hollow part (not solid), which makes it possible to reduce the weight and the material necessary for the manufacture of the first base (100*a*), and allows the cooling efficiency of the first base (100*a*) to be improved, since it is easier to dissipate heat from the first base (100*a*) when the first base (100*a*) is hollow. FIG. 11 shows a view of the surface of the first base (100*a*), opposite the cavities (101), according to this embodiment wherein the first base (100*a*) is hollow. According to an alternative embodiment, the cavities (101) of the first base (100*a*) of the first element (100) of the device for moulding plastic parts may have a generic geometry and be through cavities (101) configured to receive a mould element (117) specific for each plastic part that is to be manufactured. In this way, by means of a first generic base (100*a*), it is possible to have a first element (100) of the device for moulding plastic parts valid for manufacturing plastic parts with different geometries. It is only necessary to replace, for each different geometry of the part to be manufactured, the specific mould element (117) that fits in its external geometry in the cavity (101), and place said specific mould element (117) in the respective cavity (101), of the first base (100*a*) of the first element (100) of the device for moulding plastic parts.

Figure 12:
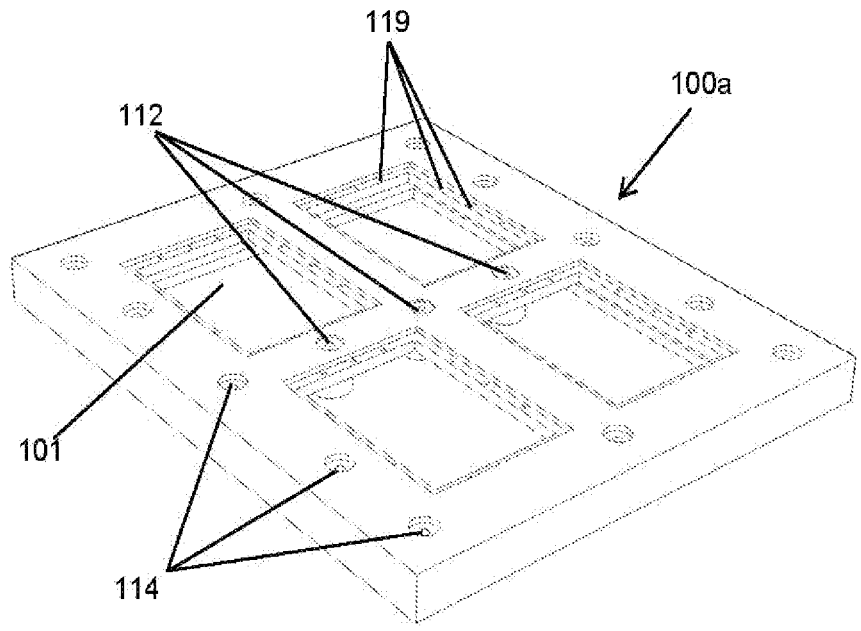
FIG. 12 shows a possible embodiment of the first base of the first element of the device for moulding plastic parts subject matter of the present invention, where said first base has a generic geometry with cavities configured to receive specific moulds with specific geometries according to the plastic part to be manufactured.
Figure 13:
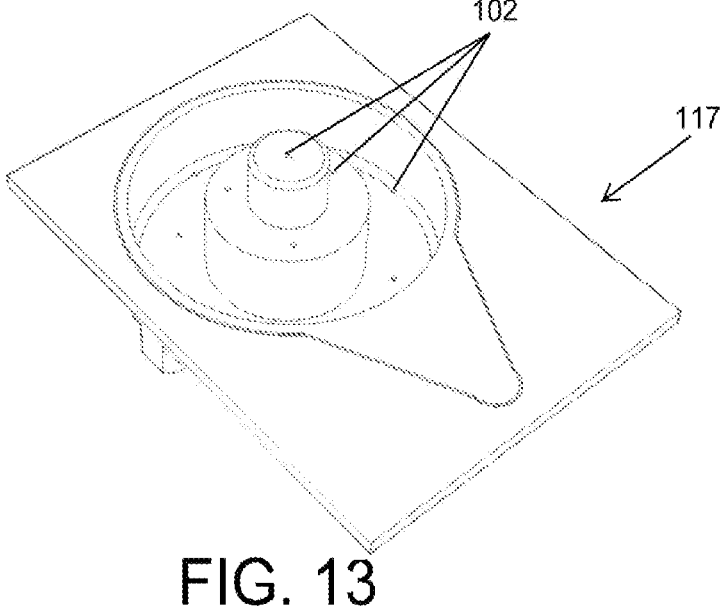
FIG. 13 shows a schematic top perspective view, according to a possible embodiment, of a specific mould element for each of the cavities of a first generic base such as that shown in FIG. 12.
Figure 14:
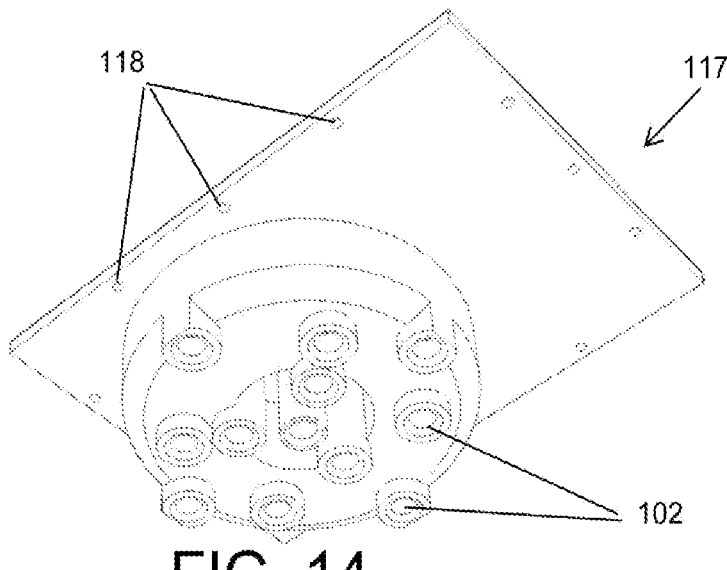
FIG. 14 shows a schematic bottom perspective view of the specific mould element shown in FIG. 13.

FIG. 12 shows this first generic base (100*a*), with through cavities (101) with a generic geometry (in this case, rectangular), each configured to receive a specific mould element (117), such as the mould element (117) shown in FIG. 13 and FIG. 14. The specific mould element (117) preferably comprises perimeter through orifices (118), located in correspondence with threaded orifices (119) in each cavity of the first base (100*a*) of the first element (100), configured to fasten each specific mould element (117) to each cavity (101) of the first base (100*a*) of the first element (100) using screws. Likewise, the mould element further comprises, similarly to each cavity (101) of the first base (100*a*), a set of suction orifices (102). This configuration, in addition to the versatility it provides, requiring only the mould element (117) to be manufactured according to the required configuration, also allows this element to be manufactured by moulding or machining, since the mould element (117) may require greater resistance if it has protrusions that may be a point susceptible to breakage, or because it is the element that suffers the most wear and may need to be replaced without having to manufacture the entire device.

Figure 15:
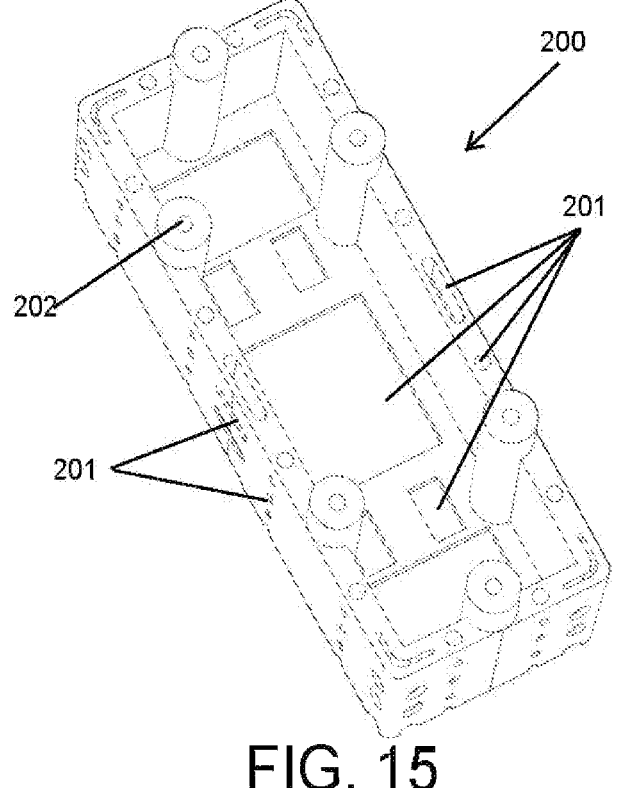
FIG. 15 shows a schematic perspective view of a possible embodiment of a second element of the device for moulding plastic parts subject matter of the present invention.

FIG. 15 shows a possible embodiment of the second element (200) of the device for moulding plastic parts, subject matter of the present invention.

The second element (200) of the device for moulding plastic parts comprises a plurality of gaseous fluid passages (201) configured to allow pressurised gaseous fluid (generally pressurised air) to pass from an external air blowing system (not shown) through said gaseous fluid passages (201), in order to push the plastic sheet against the bottom of each cavity (101) of the first base (100*a*) of the first element (100) of the device. The air blowing system thus contributes, together with the external air suction system, to shape the plastic sheet in each cavity (101) of the first base (100*a*) of the first element (100) of the device for moulding plastic parts.

The device for moulding plastic parts subject matter of the present invention preferably comprises a plurality of second elements (200) of the device, each of them configured to be located in correspondence with a corresponding cavity (101) of the first base (100*a*) of the first element (100) of the device for moulding plastic parts.

The second element (200) of the device for moulding plastic parts is equipped with fastening means for fastening to a plate (not shown), such as threaded ducts (202) located in correspondence with holes of the plate. These threaded ducts (202) allow the second element (200) of the device for moulding plastic parts to be fastened to the plate using screws.

The plate allows all the second elements (200) of the device for moulding plastic parts subject matter of the present invention to be moved as a single assembly.

The plate is equipped with a plurality of blowing orifices, configured to allow air to pass from the external air blowing system to each of the second elements (200) of the device for moulding plastic parts subject matter of the present invention. This plate can be made of resistant and lightweight materials such as wood or resin.

The invention claimed is:

1. A device for moulding plastic parts, comprising a first element (100) with at least one cavity (101) configured to receive and shape a portion or sheet of plastic material, and at least one second element (200) configured to cover the at least one cavity (101) of the first element (100) and assist in the shaping of the portion or sheet of plastic material, wherein the device is configured to shape the portion or sheet of plastic material by suction and/or blowing a gaseous fluid, wherein the first element (100) comprises:

a coolant inlet (108) configured for connection of an external coolant pumping system;

at least one coolant pipe (107), formed in the first element (100), connected to the coolant inlet (108), wherein the at least one coolant pipe (107) is configured to allow the flow of coolant along said at least one coolant pipe (107), a plurality of spray orifices (110) configured to allow the outlet of the coolant from the at least one coolant pipe (107) and its spraying against a lower face of the at least one cavity (101), and at least one drain (109) configured to allow the discharge of the coolant from the at least one coolant pipe (107), wherein the first element (100) comprises at least one cooling gallery (106) formed in the first element (100) configured to collect the coolant sprayed from the spray orifices (110) and direct the coolant towards the at least one drain (109), wherein the first element (100) comprises:

a first base (100a) which in turn comprises the at least one cavity (101), the at least one cavity (101) comprising suction orifices (102);

a second base (100b) located on the opposite side to the at least one cavity (101) of the first base (100a), and;

an intermediate panel (100c), arranged between the first base (100a) and the second base (100b);

wherein the intermediate panel (100c) comprises the coolant inlet (108), the at least one drain (109), the at least one coolant pipe (107) and the at least one cooling gallery (106), wherein the first element (100) comprises a suction nozzle (105) and the at least one cavity (101) comprises a plurality of suction orifices (102) connected to the suction nozzle (105), wherein the suction nozzle (105) is configured for the connection of an external suction system, and wherein the suction orifices (102) of the at least one cavity (101) pass through the first base (100a) and are connected to the suction nozzle (105) through suction ducts (103) arranged on the intermediate panel (100c), wherein each of the suction ducts (103) connects to each of the suction orifices (102) with a suction chamber (104) existing in a space between the intermediate panel (100c) and the second base (100b), and wherein the suction nozzle (105) is arranged in the second base (100b) and is configured to connect the suction chamber (104) with the external suction system.

2. The device for moulding plastic parts according to claim 1, wherein the at least one coolant pipe (107) comprises a narrowing (111) configured to produce an acceleration of the coolant by the Venturi effect and a homogeneous outlet of the coolant through the spray orifices (110).

3. The device for moulding plastic parts according to claim 1, the first base (100a) comprises first threaded holes (112) located in correspondence with second threaded holes (113) of the intermediate panel (100c), such that the first base (100a) is configured to be integrally joined to the intermediate panel (100c) by inserting screws in the first threaded holes (112) and in the second threaded holes (113).

4. The device for moulding plastic parts according to claim 1, wherein the first base (100a) comprises a plurality of third threaded holes (114) located in correspondence with through orifices (115) of the intermediate panel (100c) and with fourth threaded holes (116) of the second base (100b), such that the first base (100a) is configured to be integrally joined to the second base (100b), through the intermediate panel (100c), by inserting screws in the third threaded holes (114), in the through orifices (115) and in the fourth threaded holes (116).

5. The device for moulding plastic parts according to claim 4, wherein the third threaded holes (114), the through orifices (115) and the fourth threaded holes (116) are homogeneously distributed respectively along the perimeters of the first base (100a), the intermediate panel (100c) and second base (100b).

6. The device for moulding plastic parts according to claim 1, wherein the first base (100a) is a hollow part.

7. The device for moulding plastic parts according to claim 1, wherein the at least one cavity (101) has a geometry configured to receive a mould element (117), wherein the mould element (117) has a specific geometry according to the plastic part to be manufactured.

8. The device for moulding plastic parts according to claim 7, wherein each of the at least one mould element (117) comprises a plurality of perimeter orifices (118) arranged in correspondence with threaded orifices (119) of the at least one cavity (101), such that each mould element (117) is configured to be integrally joined to the at least one cavity (101), by inserting screws in the perimeter orifices (118) and in the threaded orifices (119).

9. The device for moulding plastic parts according to claim 1 wherein the at least one second element (200) comprises a plurality of gaseous fluid passages (201) configured to allow pressurised gaseous fluid to pass from an external gaseous fluid blowing system through said gaseous fluid passages (201).

10. The device for moulding plastic parts according to claim 9, wherein each of the at least one second element (200) comprises fastening means for fastening to a plate, such that, by moving the plate and its positioning on the first element (100), it is possible to position each of the at least one second element (200) in correspondence with each cavity each of the at least one cavity (101) of the first element (100), wherein the plate comprises a plurality of blowing orifices configured to allow gaseous fluid to pass from the external gaseous fluid blowing system to each of the at least one second element (200) and to each of the at least one cavity (101).

11. The device for moulding plastic parts according to claim 1 wherein the first element (100) and/or the second element (200) are manufactured by 3D printing.

* * * * *